H. R. HUGHES.
TRANSVERSE CUTTER ROTARY DRILL.
APPLICATION FILED FEB. 24, 1914.
1,124,445.
Patented Jan. 12, 1915.
2 SHEETS—SHEET 1.
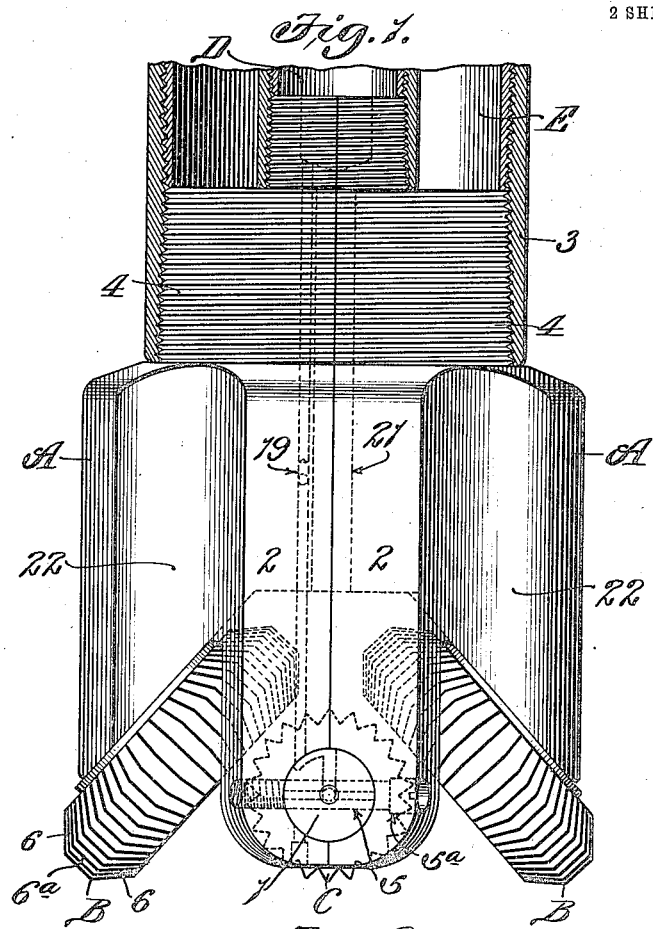
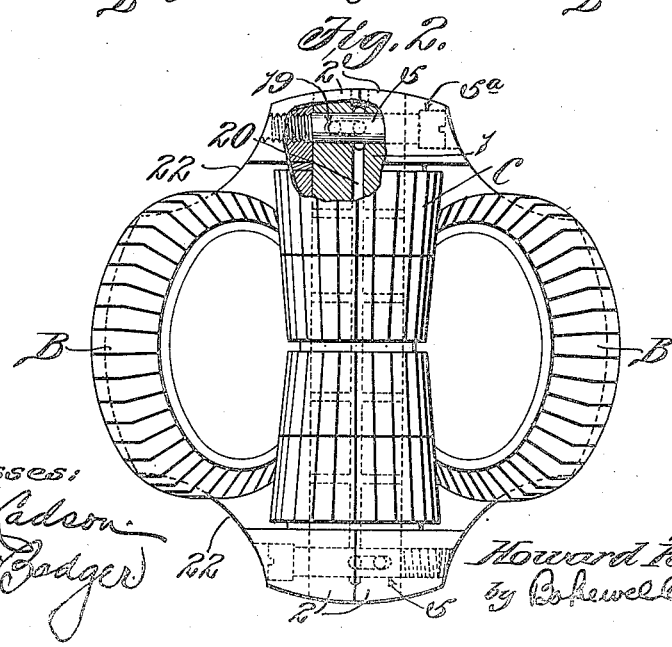
Witnesses:
Geo. R. Ladson.
C. M. Badger.
Inventor:
Howard R. Hughes.
by Bakewell & Cornwall attys.

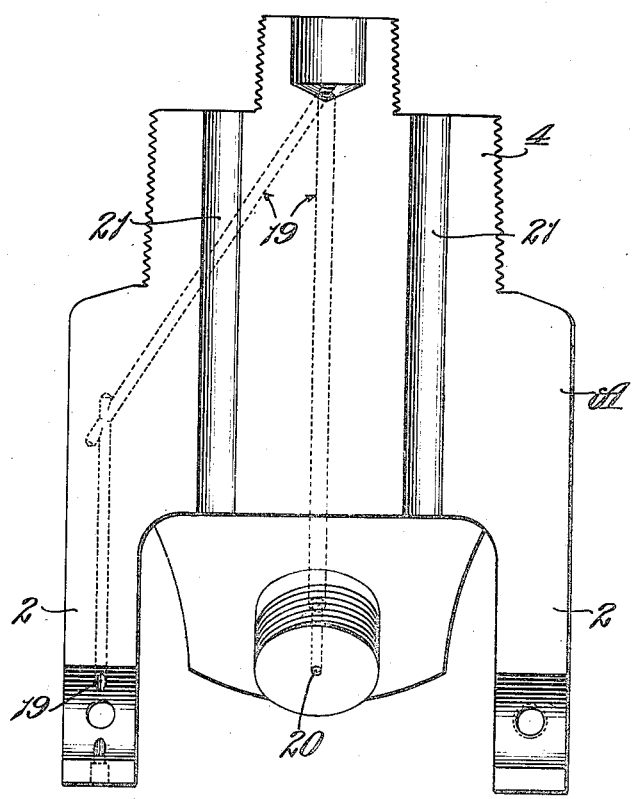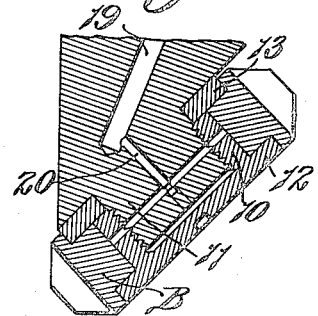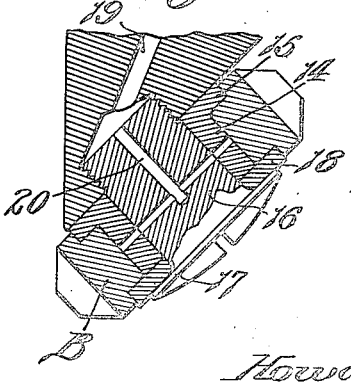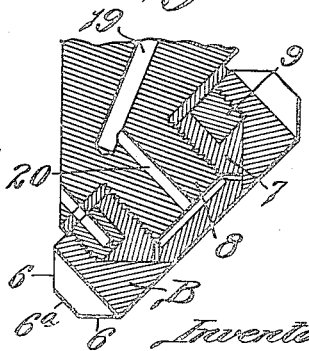

UNITED STATES PATENT OFFICE.

HOWARD R. HUGHES, OF HOUSTON, TEXAS.

TRANSVERSE-CUTTER ROTARY DRILL.

1,124,445. Specification of Letters Patent. Patented Jan. 12, 1915.

Application filed February 24, 1914. Serial No. 820,675.

*To all whom it may concern:*

Be it known that I, HOWARD R. HUGHES, a citizen of the United States, residing at Houston, Texas, have invented a certain new and useful Improvement in Transverse-Cutter Rotary Drills, of which the following is a full, clear, and exact description, such as will enable others skilled in the art to which it appertains to make and use the same.

This invention relates to rotary boring drills and particularly to drills of the type that comprise a pair of inclined rotatable side cutters that are arranged on opposite sides of a horizontally-disposed cutting device which is rotatably mounted on a shaft that extends transversely across the head of the drill.

One object of my present invention is to provide a drill of the type above mentioned in which the head is formed in sections or is composed of a plurality of parts, thereby permitting the use of larger cutters than is possible when the head of the drill is formed in one piece. And still another object is to provide a drill of the character just described in which the means that clamps the sections of the head together also serves to lock the cross shaft in the head and prevent it from rotating with relation to the head or from moving transversely of the head.

Other objects and desirable features of my invention will be hereinafter pointed out.

Figure 1 of the drawings is a side elevational view of a drill constructed in accordance with my invention; Fig. 2 is a bottom plan view of said drill, partly broken away; Fig. 3 is a side elevational view of one section of the head; and Figs. 4, 5 and 6 are detail sectional views illustrating various ways of mounting the inclined side cutters on the head.

Referring to the drawings which illustrate the preferred form of my invention, A designates two members that are clamped together to form the head of the drill, and B designates a pair of inclined side cutters which revolve in planes that converge in the head of the drill, and which are arranged on opposite sides of a horizonally-disposed cutting device that is preferably made up of a plurality of small cutters C which are rotatably mounted on a horizontal shaft 1 that extends transversely across the head of the drill. One of the inclined side cutters B is rotatably mounted on each section or part A of the head, and each of said parts or sections A is provided with a pair of integral arms or portions 2 which coöperate with similar portions on the other section to form two split bearings for the opposite ends of the cross shaft 1. In the preferred form of my invention as herein shown, the two sections or parts A of the head are clamped together by means of a coupling sleeve 3 that surrounds coöperating semi-circular-shaped portions 4 at the upper ends of said sections, and screws 5 or similar devices that pass transversely through the coöperating shaft bearing portions 2 on said sections, said screws 5 being preferably arranged in such a position in the shaft-bearing portions 2 that they pass transversely through openings in the cross shaft 1, as shown in Fig. 2, and thus prevent said shaft from moving transversely of the head or from rotating with relation to the head. Each of the screws 5 is provided with a head 5ª that bears against a shoulder in one of the side portions 2 through which the screw passes, and the opposite end of said screw is screwed into the other side portion 2 through which the screw passes so that when the screw is drawn up it will securely clamp together the two parts of the head with which it coöperates. The screws 5 preferably extend through the shaft bearing portions 2 of the head in opposite directions so that each screw is threaded into a different part of the head, as shown in Fig. 2. From the foregoing it will be seen that the devices 5 not only clamp the two sections of the head together, but they also securely lock the cross shaft 1 in the head and prevent it from moving transversely of the head or from rotating with relation to the head.

Each of the inclined side cutters B is provided with two oppositely inclined beveled cutting portions 6 of the same angle that are arranged on opposite sides of a cylindrical cutting portion 6ª, thereby forming a symmetrical cutter which can be reversed after the beveled portion 6 on one side of same that acts on the side wall of the hole, and which is subjected to the greatest wear, has become worn. This is a very desirable feature of a rotary boring drill for it overcomes the necessity of re-sharpening the side cutters or substituting new side cutters after the cutting surfaces of said cutters which act on the side wall of the hole and maintain the clearance for the drill head, have become worn to such a degree that the drill loses its clearance. This feature, however, forms no part of my present invention, as it is covered in my copending divisional application Serial #873,048, filed November 19, 1914.

The inclined side cutters B can be mounted on the head of the drill in various ways. They can be mounted in the manner shown in Fig. 6, which illustrates a structure similar to that described in my prior Patent No. 979,496, dated December 27, 1910, and which comprises a substantially cone-shaped bearing or removable spindle portion 7 that is screwed onto an integral spindle 8 on the head, and which laps over a retaining ring 9 onto which the cutter is screwed or permanently connected in any other suitable manner. Or the inclined side cutters can be mounted on the head in the manner shown in Figs. 4 and 5, both of which illustrate novel mountings for the cutters of rotary boring drills. In the construction illustrated in Fig. 4 the cutter is rotatably mounted on a cylindrical-shaped bushing 10 that is screwed onto an integral spindle 11 on the head, and an enlarged cap or end-piece 12 is formed at the outer end of said bushing so as to lap over the cutter, the cutter being preferably provided in its outer face with a recess for receiving the enlarged cap or end-piece 12 on the bushing. A similar recess is formed in the opposite side or inner face of the cutter to receive a washer 13 that is mounted on the integral spindle 11 on the head and which prevents the inner side of the cutter from bearing directly against the head. In the form illustrated in Fig. 5 the cutter is rotatably mounted on a bushing 14 that is provided at its inner end with a flange 15 which fits in a recess formed in the inner face of the cutter, and a removable spindle 16 passes through said bushing and is screwed into the head of the drill, said spindle being provided at its outer end with an enlarged head or cap-piece 17 that laps over a washer 18 which is seated in a recess formed in the outer face of the cutter. Both of the constructions illustrated in Figs. 4 and 5 form efficient mountings for reversible cutters as they provide large bearing surfaces for the cutters and permit the cutters to be reversed quickly.

A lubricant-holder D is mounted on the head of the drill in such a manner that it projects upwardly into the drill stem E to which the head of the drill is connected, and lubricating ducts 19 are formed in the sections A of the head so as to supply the lubricating medium to distributing ducts 20 formed in the spindles for the inclined side cutters and in the cross shaft 1 on which the cutters C revolve. The usual watercourses 21 are formed in the head of the drill for the water that is pumped down through the drill stem to flush the disintegrated material out of the hole, and vertically-disposed grooves or channels 22 are formed in the outer surface of the head so as to permit the disintegrated material and the flushing water to escape upwardly past the head.

Having thus described my invention, what I claim as new and desire to secure by Letters Patent is:

1. A rotary boring drill comprising a head composed of a plurality of sections, inclined side cutters on said head which revolve in planes that converge in the head, and a transversely-disposed cutting device mounted on a horizontal shaft whose end portions are seated in bearings formed in the meeting faces of the sections of the head.

2. A rotary boring drill provided with a head composed of a plurality of sections that are divided by a split or joint which extends transversely of the head, a horizontally-disposed cutter supporting shaft seated in split bearings formed in coöperating portions of the sections of the head, and devices that clamp said sections together and also engage said shaft and lock it in position.

3. A rotary boring drill provided with a head composed of a plurality of sections, a horizontally-disposed cutter supporting shaft seated in split bearings formed in coöperating portions of the sections of the head, and devices which clamp said sections together and which prevent said shaft from rotating or moving transversely of the head.

4. A rotary boring drill provided with a head composed of a plurality of sections, a horizontally - disposed cutter supporting shaft seated in split bearings formed in coöperating portions of the sections of the head, and devices that clamp said sections together and which pass through openings formed in said shaft so as to prevent it from rotating or moving transversely of the head.

5. A rotary boring drill comprising a head composed of a plurality of sections having coöperating shaft-bearing portions, a horizontally-disposed cutter supporting shaft mounted in the shaft-bearing portions of said head, means arranged at the upper end of the head for clamping the sections of same together, and devices passing transversely through the shaft-bearing portions of the head and engaging the shaft mounted therein for clamping the sections of the head together and for retaining said shaft in position.

6. A rotary boring drill comprising a head composed of two sections that are provided with coöperating portions which form split bearings, a horizontally-disposed shaft mounted in said split bearings, a rotatable cutting device mounted on said shaft, inclined side cutters arranged on opposite sides of said cutting device and revolving in planes that converge in the head, means for clamping the sections of the head together and for locking said shaft and said bearings, and grooves or channels formed in the outer surface of the head to provide clearance for the disintegrated material that is flushed out of the hole.

In testimony whereof I hereunto affix my signature in the presence of two witnesses, this 16th day of February 1914.

HOWARD R. HUGHES.

Witnesses:
L. A. GODBOLD,
C. E. REED.